United States Patent
Peardon

(10) Patent No.: US 10,202,072 B2
(45) Date of Patent: Feb. 12, 2019

(54) BRAKE WARNING LAMP SYSTEM

(71) Applicant: Malcolm John Peardon, Brisbane (AU)

(72) Inventor: Malcolm John Peardon, Brisbane (AU)

( * ) Notice: Subject to any disclaimer, the term of this patent is extended or adjusted under 35 U.S.C. 154(b) by 0 days.

(21) Appl. No.: 15/556,881

(22) PCT Filed: Mar. 9, 2016

(86) PCT No.: PCT/AU2016/000076
§ 371 (c)(1),
(2) Date: Sep. 8, 2017

(87) PCT Pub. No.: WO2016/141410
PCT Pub. Date: Sep. 15, 2016

(65) Prior Publication Data
US 2018/0015874 A1    Jan. 18, 2018

(30) Foreign Application Priority Data

Mar. 10, 2015    (AU) .................................. 2015900847

(51) Int. Cl.
*B60Q 1/44*    (2006.01)
*B60Q 1/30*    (2006.01)
*B60Q 1/46*    (2006.01)

(52) U.S. Cl.
CPC .............. *B60Q 1/444* (2013.01); *B60Q 1/30* (2013.01); *B60Q 1/46* (2013.01); *B60Q 2900/30* (2013.01)

(58) Field of Classification Search
CPC ........ B60Q 1/44; B60Q 1/46; B60W 2710/18
USPC .......................... 340/467, 479, 478, 468, 464
See application file for complete search history.

(56) References Cited

U.S. PATENT DOCUMENTS

| 5,847,513 | A | 12/1998 | Host | |
| 6,150,933 | A * | 11/2000 | Matsumoto | B60Q 1/444 340/467 |
| 6,351,211 | B1 * | 2/2002 | Bussard | B60Q 1/302 340/438 |
| 9,878,658 | B2 * | 1/2018 | Meyer-Wendt | B60Q 1/441 |
| 2002/0133282 | A1 * | 9/2002 | Ryan | B60Q 1/444 701/70 |
| 2003/0171890 | A1 * | 9/2003 | Traylor | B60Q 1/444 702/141 |

(Continued)

FOREIGN PATENT DOCUMENTS

| GB | 2341736 | 3/2000 |
| GB | 2419045 | 4/2006 |

OTHER PUBLICATIONS

International Preliminary Report on Patentability for PCT Application No. PCT/AU2016/000076 dated Feb. 8, 2017.

*Primary Examiner* — Phung Nguyen
(74) *Attorney, Agent, or Firm* — Tumey L.L.P.

(57) ABSTRACT

A brake warning lamp system for a vehicle including: one or more primary brake lamps in a first set of brake lamps facing outwards from the rear of the vehicle; one or more secondary brake lamps in a second set of brake lamps facing outward from the rear of the vehicle and spaced from the primary brake lamps; sensing means for sensing deceleration of the vehicle; and control means operatively connected to the sensing means for selectively connecting the first and second set of brake lamps to the power supply of the vehicle to selectively illuminate the primary and/or secondary brake lamps.

15 Claims, 2 Drawing Sheets

(56) References Cited

U.S. PATENT DOCUMENTS

| | | | |
|---|---|---|---|
| 2007/0168129 A1* | 7/2007 | Thorne | B60Q 1/525 701/301 |
| 2008/0023273 A1* | 1/2008 | Toelge | B60Q 1/444 188/1.11 E |
| 2010/0117818 A1 | 5/2010 | Kao | |
| 2013/0110347 A1 | 5/2013 | Ge | |
| 2014/0070937 A1* | 3/2014 | Anderson | B60Q 1/447 340/464 |
| 2015/0137965 A1* | 5/2015 | Lanham | B60Q 1/2607 340/479 |

\* cited by examiner

BRAKE WARNING LAMP SYSTEM

TECHNICAL FIELD

This invention relates to a brake warning lamp system. The invention has particular application to a brake warning lamp system for motor vehicles being operated on roads and road-related areas and more particular application to vehicles being operated on motorways.

BACKGROUND ART

Motor vehicles have brake warning lights and such warning lights have been effective in reducing road crashes. However, with roads becoming more crowded, there is an increased risk of rear-end crashes. This is particularly the case on motorways because road traffic moves fast and is not stopped regularly by traffic lights or intersections. While the use of brake warning lights has been effective, it has long been recognised that one shortcoming is the fact that the warning lights by themselves provide no information as to how quickly the braking vehicle is slowing or stopping. This is particularly the case where, in a group of vehicles travelling together, one or more vehicles have been braking lightly, thereby activating the brake warning lamps, but are then required to brake more heavily. The drivers of the vehicles following are then taken by surprise and the risk of collision is increased, even when drivers follow at recommended safe distances from the vehicle in front.

In some circumstances, drivers use their hazard lights to indicate that they are braking hard, or have slowed significantly or have stopped, but there is no requirement to use hazard lights and not all drivers follow the practice. In some jurisdictions, the use of hazard lights on moving vehicles is prohibited.

The present invention aims to provide a brake warning lamp system which alleviates the aforesaid problems or at least provides a working alternative to existing systems. Other aims and advantages of the invention may become apparent from the following description.

DISCLOSURE OF THE INVENTION

With the foregoing in view the present invention in one aspect resides broadly in a brake warning lamp system for a vehicle including:

one or more primary brake lamps in a first set of brake lamps facing outwards from the rear of the vehicle;

one or more secondary brake lamps in a second set of brake lamps facing outward from the rear of the vehicle and spaced from the primary brake lamps;

sensing means for sensing deceleration of the vehicle; and control means operatively connected to the sensing means for selectively connecting the first and second set of brake lamps to the power supply of the vehicle to selectively illuminate the primary and/or secondary brake lamps.

In another aspect, the present invention resides broadly in a method of operating brake warning lamps in a brake warning lamp system for a vehicle including:

providing one or more primary brake lamps in a first set of brake lamps facing outwards from the rear of the vehicle;

providing one or more secondary brake lamps in a second set of brake lamps facing outward from the rear of the vehicle and spaced from the primary brake lamps;

providing sensing means for sensing deceleration of the vehicle;

operatively connecting control means to the sensing means and the first and second set of brake lamps; and selectively connecting the primary and/or secondary brake lamps to the power supply of the vehicle to selectively illuminate the primary and/or secondary brake lamps.

The control means includes input from the brake pedal to illuminate the primary brake lamps and activate the sensing means for sensing the deceleration of the vehicle, whereupon the sensing means returns a value to the control means for selectively illuminating the secondary brake lamps. In such form, the control means causes the brightness and or intermittence of timing or pulsing or flashing of the second set of brake lamps according to the value returned from the sensing means. The selective illumination may include illuminating some of the secondary brake lamps, illuminating them in turn, with fluctuating brightness or such like.

The sensing means preferably includes a GPS tracking device or such like or two or more such devices, each being designed to include capability, or programmed to have the capacity, to determine the deceleration of the vehicle within a relatively short timeframe. Alternatively, or in conjunction therewith, the sensing means may include input from the vehicle speedometer, engine control unit or such like. Some vehicles may include a proximity sensor which may be integrated into the sensing means. The control means may be programmed to accommodate additional input information from such sources. Moreover, if research into which illumination pattern produces the optimum effect, the selective illumination so determined can be programmed into the control means according to the invention.

BRIEF DESCRIPTION OF THE DRAWINGS

In order that the invention may be more readily understood and put into practical effect, reference will now be made to the following drawings which illustrate an example of the system according to the invention, and wherein.

DESCRIPTION OF EMBODIMENTS

Figure 1:
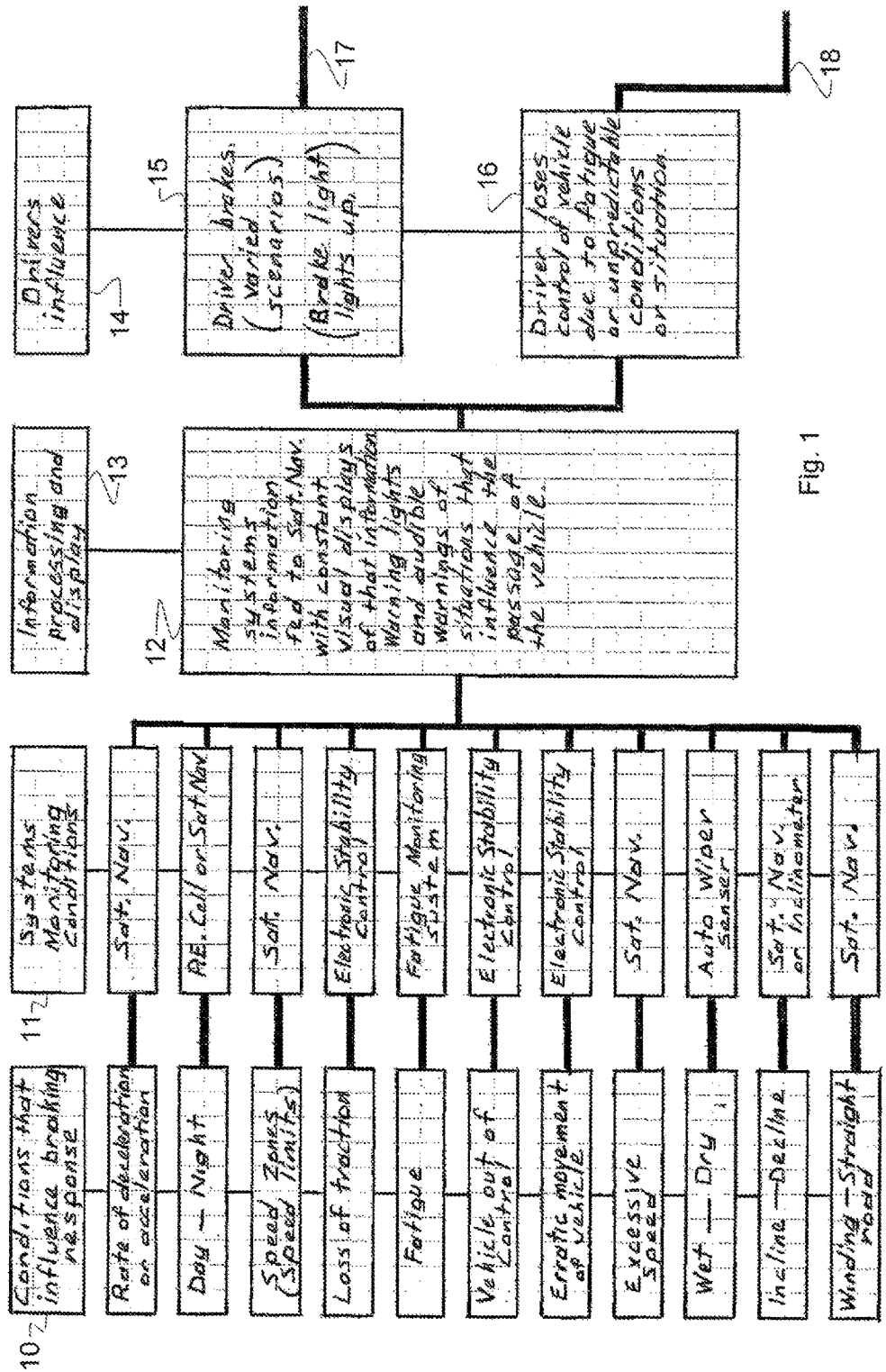
FIG. 1 is a diagrammatic representation of part of a system flowchart for a break warning system according to the invention.
Figure 2:
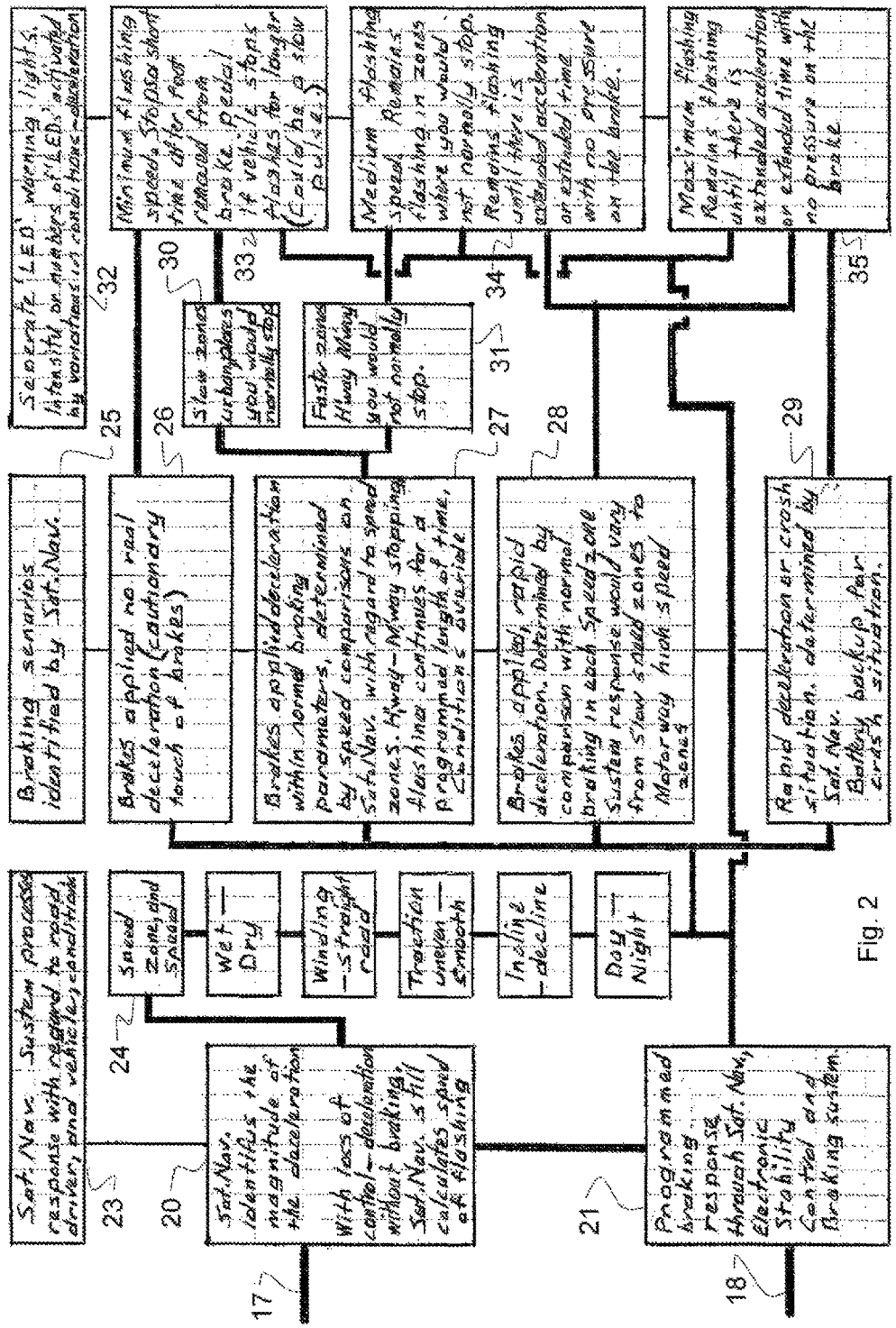
FIG. 2 is a diagrammatic representation of the remainder of the flowchart of FIG. 1.

The brake warning system illustrated in FIGS. 1 and 2 includes a set of conditions ("input conditions") which influence braking response at 10 and a set of sub-systems which monitor the input conditions ("input monitoring conditions") at 11. In the example illustrated, the input conditions are as follows:

"rate of deceleration or acceleration" is monitored by a satellite notification system.

"Day or night" is monitored by a photoelectric ("PE") cell, clock, satellite navigation or such like.

"Speed zones (speed limits)" is monitored by the satellite navigation system.

"Loss of traction" is monitored by an (electronic) automatic stability and traction control (ASTC) system.

"Fatigue" is monitored by a fatigue monitoring system.

"Vehicle out of control" is monitored by the ASTC system.

"Erratic movement of vehicle" is monitored by the ASTC system.

"Excessive speed" is monitored by satellite navigation system.

"Wet or dry" is monitored by an auto wiper sensor system.

"Incline or decline" is monitored by the satellite navigation system or an inclinometer.

"Winding or straight road" (sight line for crests and curves) is monitored by the satellite navigation system.

The input monitoring conditions once monitored are input to an information processing and display system at 13 in which a monitoring systems display at 12 displays warnings and/or produces audible sounds in order to warn of situations that influence the passage of the vehicle. The drivers influence at 14 rising input in respect of the driver brakes at 15 (switch lights up the brake lights) to produce an output ("normal output") at 17. If the driver exerts too much influence or loses control of the vehicle due to fatigue or unpredictable conditions or situations at 16, the output ("critical output") at 18 is produced.

When a normal output is detected at 20, the satellite navigation system identifies the magnitude of deceleration. With loss of control, deceleration without braking, the satellite navigation system still calculates the speed of flashing of the brake lights. The critical output is received at 21, a program braking response to the satellite navigation system and ASTC systems is also put into effect. As set forth at 23, the satellite navigation system processes the response with regard to the road, the driver the vehicle and conditions. The input conditions at 24 include the speed zone and speed of the vehicle, or wet or dry conditions, winding or straight, level of the road, traction of the surface (uneven or smooth), incline or decline in the road, day or night (light conditions).

The GPS tracking position of the vehicle at rapid time intervals determines the speed, and the speed so determined may be stored over a plurality of successive elapsed periods of time which may be sequential or may overlap, thereby providing for the calculation of a time rate of change of speed for determination of deceleration of the vehicle for the method and system of the invention.

There are several breaking scenarios identified by the satellite navigation system at 25 which include the following: The brakes are applied lightly with no significant deceleration (cautionary touch of the brakes) at 26. The brakes are applied to decelerate the vehicle within normal braking parameters, determined by speed comparisons on the satellite navigation system with regard to speed zones, highway or motorway stopping, flashing continuing for a programmed period of time (which may be overridden by conditions) at 27. The brakes are applied firmly for rapid deceleration, determined by comparison with normal braking in each speed zone. The system response would vary from slow speed zones to motorway or high speed zones act 28. A rapid deceleration crash situation may be determined by the satellite navigation system, battery backup for crash situation would be applied, at 29.

The satellite navigation system determines whether the vehicle is in a slow zone, including urban places where the driver would more frequently stop as indicated at 30. The satellite navigation system determines whether the vehicle is in fast zones, such as highway, motorway or the open road where the driver would not normally stop is indicated at 31.

Separate warning lamps, preferably light emitting diode (LED) warning lights, the intensity or number of LEDs activated by variations in conditions or deceleration form part of the system at 32. If an input is received from the slow zone monitor 30 or the cautionary touch of brakes at 26, a minimum flashing speed is produced by the lamps as indicated at 32, the flashing of the lamps continuing for a short period of time after the driver removes his or her foot brake pedal. If the vehicle stops, the lamps flash for a longer period of time, or could be a slow pulse.

A program braking response as at 21, the determination is made as to whether medium flashing speed is used at 34, wherein the lamps remain flashing in zones where driver would not normally stop and remain flashing until there is an extended acceleration or extended time with no pressure on the brake pedal. If there is a rapid deceleration detected by the program braking response system, the maximum flashing occurs, and remains until there is extended acceleration or an extended time with no pressure on the brake is catered at 35.

In the system according to the invention, the satellite navigation system would only control warning lights. It would not override any other systems on board. In all cases, what the warning light on the rear of the vehicle is doing, is replicated on the satellite navigation system display. The warning lights could be used to great effect by increasing intensity of the illuminated lamps in predetermined conditions. Daytime lights could be brighter; on winding roads with hidden corners, the lights could be brighter and fast flashing. In rain conditions, lights may be brighter. In the case of driver fatigue, a brighter flashing light in the satellite navigation system display would not only alert the driver, it could mean in most cases, especially in the case of motorcars, be seen by a following driver.

Another use of the centre brake light would be to give pre-warning to following traffic that the vehicle is about to slow down unexpectedly, particularly where such deceleration could be predictable, but not common, such as where the vehicle is about to make a turn, take a motorway exit, stop at an address in a local street, enter a break-down bay or lay-by, where most of the traffic would be proceeding straight through. The GPS gives a pre-warning to the driver 200 meters or more before a change in movement, the pre-warning being relayed to following vehicles at the same time, by a short programmed signal. Following traffic could already be taking appropriate measures before the blinker or brake lights come on to signal the final intentions of the braking or slowing vehicle.

The brake lamp warning system according to the invention may be installed in new vehicles when they are manufactured or in existing vehicles as an additional feature. For example, in the case of existing vehicles, it is common practice to include an extra brake lamp in the centre of the rear of the vehicle, such as in the rear window or in the lid of the boot or trunk. The extra brake lamp may be used as the secondary brake lamp according to the invention, the normal brake lamps—that is, the brake lamps incorporated into the rear lamp assemblies along with rear parking or driving lamps, indicating lamps and the like—may be used as the primary brake lamps according to the invention.

The method and system according to the present invention may also have application to autonomous vehicles or "self-driving" vehicles. In such form, the signals used to determine the brake warning lamp behaviour may be broadcast as a predetermined wireless signal to be received by an autonomous vehicle. Moreover, the system according to the present invention may be installed into an autonomous vehicle to produce the warning lamp behaviour according to the method of the invention.

Although the invention has been described with reference to a specific example, it will be appreciated by those skilled in the art that the invention may be embodied in other forms within the broad scope and ambit of the invention as herein set forth and defined by the following claims.

What is claimed is:

1. A brake warning lamp system for a vehicle having a rear, a power supply, a speedometer, an engine control unit and a brake pedal for operating a brake, the system including:
   one or more primary brake lamps in a first set of brake lamps facing outwards from the rear of the vehicle;
   one or more secondary brake lamps in a second set of brake lamps facing outward from the rear of the vehicle and spaced from the primary brake lamps;
   sensing means for sensing deceleration of the vehicle; and
   connecting satellite navigation system which controls the first and second set of brake lamps to the power supply of the vehicle to selectively illuminate the primary and secondary brake lamps, the illumination being selectable from range of flashing speeds according to a set of input conditions and a set of monitoring conditions wherein the flashing speed is a medium flashing when the input conditions indicate that the vehicle is in a zone where the vehicle would not normally stop, decelerate or move slowly and remaining flashing until there is an extended acceleration or extended time with no pressure on the brake pedal.

2. The system according to claim 1, wherein the flashing speed is a rapid flashing speed if a rapid deceleration is detected, the rapid flashing remaining until there is extended acceleration or an extended time with no pressure on the brake.

3. The system according to claim 1, wherein the control means includes input from the brake pedal to illuminate the primary brake lamps and activate the sensing means for sensing the deceleration of the vehicle, whereupon the sensing means returns a value to the control means for selectively illuminating the secondary brake lamps whereby the control means causes intermittence of timing or pulsing or flashing of the second set of brake lamps according to the value returned from the sensing means.

4. The system according to claim 1, wherein the sensing means includes a GPS tracking device having capability to determine the deceleration of the vehicle.

5. The system according to claim 4, wherein the GPS tracking device controls only warning lights.

6. The system according to claim 1, wherein the sensing means includes input from the speedometer.

7. The system according to claim 1, wherein the sensing means relies on a plurality of inputs.

8. The system according to claim 1, including sensing that the vehicle is moving more slowly than expected or is stopped in a particular speed zone.

9. The system according to claim 1, wherein the inputs include GPS information and the sensing means is prompted by the GPS information of upcoming turns, slowing or stopping in order to follow GPS directions.

10. The system according to claim 9 wherein the GPS information includes one or more manoeuvres.

11. The system according to claim 9 wherein the GPS information includes a plurality of destinations.

12. The system according to claim 1, wherein the set of input conditions includes first set of input conditions which influence braking response and a second set of input conditions being input monitoring conditions, wherein the input conditions and input monitoring conditions are selected from a group consisting of:
   "rate of "rate of deceleration or acceleration" as monitored by a satellite notification system;
   "day or night" as monitored by a photoelectric ("PE") cell, clock, and/or satellite navigation;
   "speed zones (speed limits)" as monitored by the satellite navigation system;
   "loss of traction" is monitored by an (electronic) automatic stability and traction control (ASTC) system;
   "fatigue" as monitored by a fatigue monitoring system;
   "vehicle out of control" as monitored by the ASTC system;
   "erratic movement of vehicle" as monitored by the ASTC system;
   "excessive speed" as monitored by satellite navigation system;
   "wet or dry" as monitored by an auto wiper sensor system;
   "incline or decline" as monitored by the satellite navigation system or an inclinometer;
   "winding or straight road" (sight line for crests and curves) as monitored by the satellite navigation system.

13. The system according to claim 1, wherein the control means includes input from the brake pedal to illuminate the primary brake lamps and activate the sensing means for sensing the deceleration of the vehicle, whereupon the sensing means returns a value to the control means for selectively illuminating the secondary brake lamps whereby the control means causes second set of brake lamps to illuminate to a predetermined brightness according to the value returned from the sensing means.

14. The system according to claim 1, wherein the sensing means includes input from the engine control unit.

15. A method of operating brake warning lamps in a brake warning lamp system for a vehicle having a rear, a power supply, a speedometer, an engine control unit and a brake pedal for operating a brake, the method including:
   providing one or more primary brake lamps in a first set of brake lamps facing outwards from the rear of the vehicle;
   providing one or more secondary brake lamps in a second set of brake lamps facing outwards from the rear of the vehicle and spaced from the primary brake lamps;
   providing sensing means for sensing deceleration of the vehicle to produce a value;
   operatively connecting control means to the sensing means and the first and second set of brake lamps;
   selectively connecting the primary and secondary brake lamps to the power supply of the vehicle to selectively illuminate the primary and/or secondary brake lamps according to the value provided by the sensing means; including determining whether the driver is at a location where the driver would not normally stop, whereupon a medium flashing sped is used and remains until there is an extended acceleration or extended time with no pressure on the brake pedal and detecting a rapid deceleration, whereupon the maximum flashing occurs and remains until there is extended acceleration or an extended time with no pressure on the brake.

* * * * *